(12) United States Patent
Willems et al.

(10) Patent No.: US 6,938,255 B1
(45) Date of Patent: Aug. 30, 2005

(54) PROCESS, MODULES AND SWITCHING CENTER FOR IDENTIFYING PROCESSES AS WELL AS THEIR DATA AND RESOURCES

(75) Inventors: Matthias Willems, Leonberg (DE); Luc Ongena, Mechelen (BE); Rolf Kunkel, Freiberg (DE)

(73) Assignee: Alcatel, Paris (FR)

( * ) Notice: Subject to any disclaimer, the term of this patent is extended or adjusted under 35 U.S.C. 154(b) by 545 days.

(21) Appl. No.: 09/365,784

(22) Filed: Aug. 3, 1999

(30) Foreign Application Priority Data

Aug. 4, 1998 (DE) ......................................... 198 35 177

(51) Int. Cl.⁷ ................................................. G06F 9/46
(52) U.S. Cl. ...................... 718/104; 718/100; 718/102; 718/106
(58) Field of Search .......................... 709/100, 102–108

(56) References Cited

U.S. PATENT DOCUMENTS

| | | | | |
|---|---|---|---|---|
| 5,644,719 A | * | 7/1997 | Aridas et al. ................ | 709/223 |
| 5,802,590 A | * | 9/1998 | Draves ......................... | 709/104 |
| 5,894,555 A | * | 4/1999 | Harada et al. .............. | 709/213 |
| 5,974,134 A | * | 10/1999 | Park ........................ | 379/203.01 |
| 6,108,715 A | * | 8/2000 | Leach et al. ................ | 709/203 |
| 6,119,145 A | * | 9/2000 | Ikeda et al. ................. | 709/203 |
| 6,253,225 B1 | * | 6/2001 | Nakahara et al. ........... | 709/100 |

FOREIGN PATENT DOCUMENTS

| | | |
|---|---|---|
| DE | 196 22 065 C1 | 9/1997 |
| DE | 197 34 320 A1 | 2/1998 |
| EP | 0 457 117 A2 | 11/1991 |
| EP | 0 750 257 A1 | 12/1996 |

* cited by examiner

*Primary Examiner*—Meng-Al T. An
*Assistant Examiner*—Syed J Ali
(74) *Attorney, Agent, or Firm*—Sughrue Mion, PLLC

(57) ABSTRACT

In a process for identifying a process (P1) and its resources, the process (P1) is provided with a first identifier (PID1) that unambiguously identifies the process (P1) and its resources. The process (P1) is further provided with a second identifier (RID1) that unambiguously identifies the process (P1) and its resources, and particularly after a premature termination of the process (P1), a new process (P2) which continues the functions of the terminated process (P1) is started. The new process (P2) retains the second identifier (RID1) of the terminated process (P1) as its second identifier. The new process (P2) which continues the terminated process (P1) can then, furthermore, access the resources of the terminated process (P1).

12 Claims, 2 Drawing Sheets

PROCESS, MODULES AND SWITCHING CENTER FOR IDENTIFYING PROCESSES AS WELL AS THEIR DATA AND RESOURCES

BACKGROUND OF THE INVENTION

The invention concerns a process for identifying processes, preferably telecommunications processes, as well as their resources, each of which is provided with a (first) identifier unambiguously identifying this process, and further concerns a suitable computer, program or software module for implementing this process, as well as a switching centre having such a module.

Such a process has been disclosed by U.S. Pat. No. 5,644,719, for example.

With quasi-simultaneous processing of several processes with a computer (multitasking) the processing of processes in a computer is nested or interleaved chronologically by an appropriate process controlled by an operating system, so that the processing is effected in a quasi-simultaneous manner. To do this, each process receives a so-called process identifier (PID), that is assigned only once in the system and therefore unambiguously identifies the process. Resources such as, for example, stacks or memory location, that are made available to a process by the operating system, or even data, are provided with the respective process identifier in order to identify their allocation to the respective process. If a process is terminated, the memory location, for example, in which data of the terminated process are stored, is freed by using the identifier.

If a process is aborted prematurely, that is to say not terminated normally, because an error has occurred, for example, a new process is started that is intended to replace this abnormally terminated process. Of course, the new process which receives a new process identifier cannot access the data of the aborted process, since these are identified by the process identifier of the terminated process. If one of several mutually coupled processes is prematurely terminated, the new process continuing this process must be synchronised to the remaining processes in a complicated manner. And if a process does not run for a prolonged period of time it cannot be terminated since, otherwise, access to its data is no longer possible at a later time. This leads to a high requirement for storage space and consequently for the resources to be provided.

In the case of the nested computers described in U.S. Pat. No. 5,644,719, the operating system also allocates process identifiers (PID) to application processes that are handled by the computer, these process identifiers being used by the operating system during the transmission of messages between the processes.

SUMMARY OF THE INVENTION

The object of the invention is therefore to develop a method of the type stated above in such a way that a new process that is continuing a terminated process is able to access the data and resources of the terminated process, and to create suitable modules and a switching centre for this purpose.

This object is achieved according to the invention, in that a process and its resources are provided with a further (second) identifier unambiguously identifying the process and, particularly after premature termination of the process, a process which continues the functions of the terminated process is started, which retains the second identifier of the terminated process as the second identifier.

According to the invention, in addition to the first process identifier that is dependent on the life of its process, resources, for example, data, are identified by a second identifier—described in the following text as the reference identifier (RID)—that is independent of the life of the process. The continuing new process can thus access resources of the terminated process. The reference identifier facilitates rapid and secure access to data of a terminated process. If one of several chronologically coupled processes is prematurely terminated, the continuing process takes the place of the terminated one without any time delay, so that synchronisation with the remaining processes is not necessary.

Equipped with the newly assigned reference identifier of the terminated process, the new process assumes the functions of the terminated process. Consequently, the reference identifier enables communication on the basis of the function and not on the basis of the process, as is the case when only the first process identifier is used. The system gains flexibility.

In preferred developments of the invention, the reference identifiers (RID) are protected against restarting and/or reloading of a control element, and particularly those processes, data and resources that are dependent on the restarting and reloading of their control unit, are identified by them. The process synchronisation that is otherwise required after restarting or reloading of the control unit can be eliminated.

By enabling the reference identifier only when the functions of the first process provided with this reference identifier have been executed, this ensures that the functions are also successfully carried out.

The reference identifiers are preferably managed by the operating system, and also assigned or requested by said operating system. The process continuing the functions of the terminated process is also requested by the operating system.

In a further advantageous development of the process, provision is made for the reference identifier to be transmitted jointly with other data in a (process-specific) data word. This enables messages to be transmitted simultaneously with the reference identifiers. If the reference identifier, composed for example, of 32 bits, that identifies a process in a destination computer, is present, then with the 48-bit data structure which is usual for such processes the remaining 16 bits can be used for specifying the virtual path to this destination computer. The communications software can then encrypt this two-part data word accordingly.

The reference identifiers can be stored in tables, preferably in a common table, and allocated according to their chronological order of rank (priority). A reference identifier is then only enabled from this table if its functions have been carried out, if necessary by subsequent processes.

In a particularly preferred development of the process, if a process that is not required is terminated ("put to bed"), in particular by the operating system, it is "brought back to life" on request in a new process that continues this put-to-bed process with the aid of the reference identifier. As a result, resources are kept free, so that with a constant number of operating system resources (process control blocks) considerably more processes (e.g. a factor of 15) can be managed.

In a further aspect, the invention also concerns a suitable computer module, program module or software module for implementing the method as described, as well as a switching centre having at least one such module. Such a switching centre can be a node in a telecommunication network, for example.

BRIEF DESCRIPTION OF THE DRAWINGS

Further advantages of the invention are revealed in the description and the drawing. According to the invention, the above-mentioned features and those to be cited later on can be used individually or in any combination. The illustrated and described embodiments should not be considered as a final list, but rather have an exemplary character for the description of the invention.

DETAILED DESCRIPTION OF THE INVENTION

Figure 1:
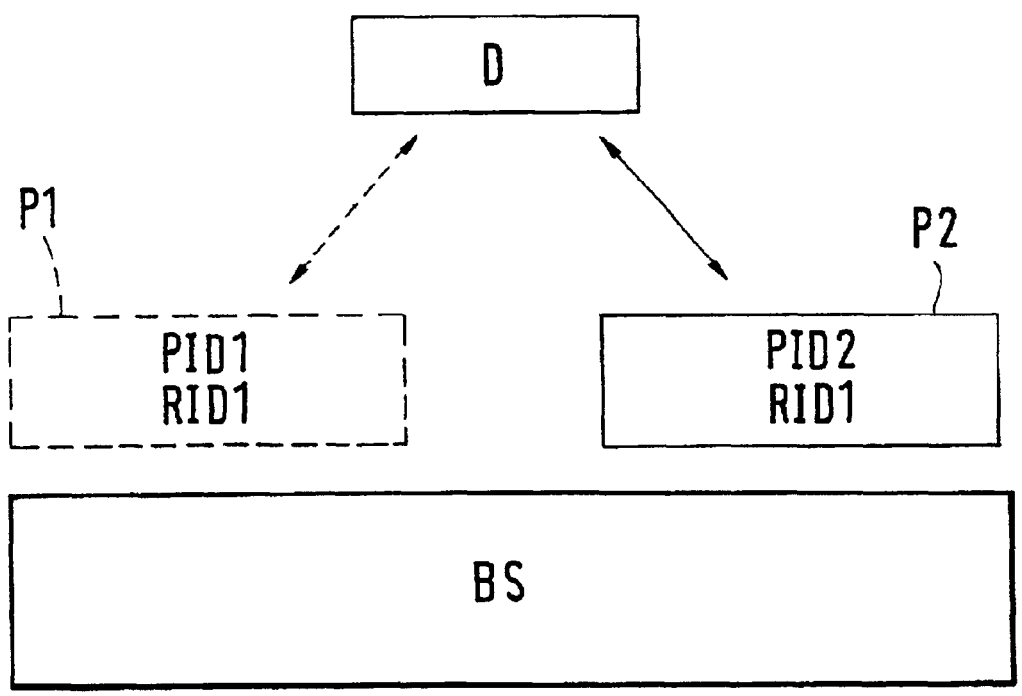
FIG. 1 shows schematically two processes, one of which continues the other and retains the same second identifier.

In FIG. 1, an operating system with which the processing of multitasking processes is controlled is denoted by BS. One such process P1 receives from the operating system BS a first (process) identifier PID1 and a second (reference) identifier RID1, both of which are assigned only once, so that the process P1 is unambiguously identified by each of these two identifiers. Resources such as data D, to which the process P1 has access or which were generated by it, are identified in this manner.

The process identifier PID1 is dependent on the life of its process P1 and is used, for example, to manage the process resources and to control databank transactions. Restarting and/or reloading terminate the process P1 and the life of this identifier.

The reference identifier RID1 is independent of the life of the process P1 and exists until it functions are executed. This identifier is used to manage process data dependent on restarting and/or reloading and offers user software the possibility of operating with a process identification code independent of a restart and/or reload.

If the process P1 is terminated prematurely (shown by dashed lines), because an error has occurred, for example, a new process P2 having a first (process) identifier PID2 and continuing the functions of the terminated process P1 is started. This new process P2 retains the reference identifier RID1 of the terminated process P1 as its reference identifier. The new process P2 can also access the resources and data D of the terminated process P1, and thus continue its functions, via the reference identifier RID1. A reference identifier RID is deallocated only if a process comes to a normal end.

If, in the telecommunication field, the process P1 has handled a telephone call, for example, with premature termination of the process P1 its data D could still be used for ending the telephone call. The new process P2 can read the data D associated with the telephone call in order to terminate the call, or the new process P2 is the receiver of messages which are still to be sent to the terminated process P1. The reference identifier RID simplifies and accelerates the resynchronisation of associated, distributed processes following restarting or reloading of a control unit participating in the control of a telephone call. Moreover, as an operating system function, the reference identifier RID enables application software to maintain stable telephone calls despite the restarting and/or reloading of a control unit and to rapidly locate call-relevant data that are stored in a databank. That is to say, fast and secure access to call-relevant data is possible, even after restarting and/or reloading.

Figure 2:
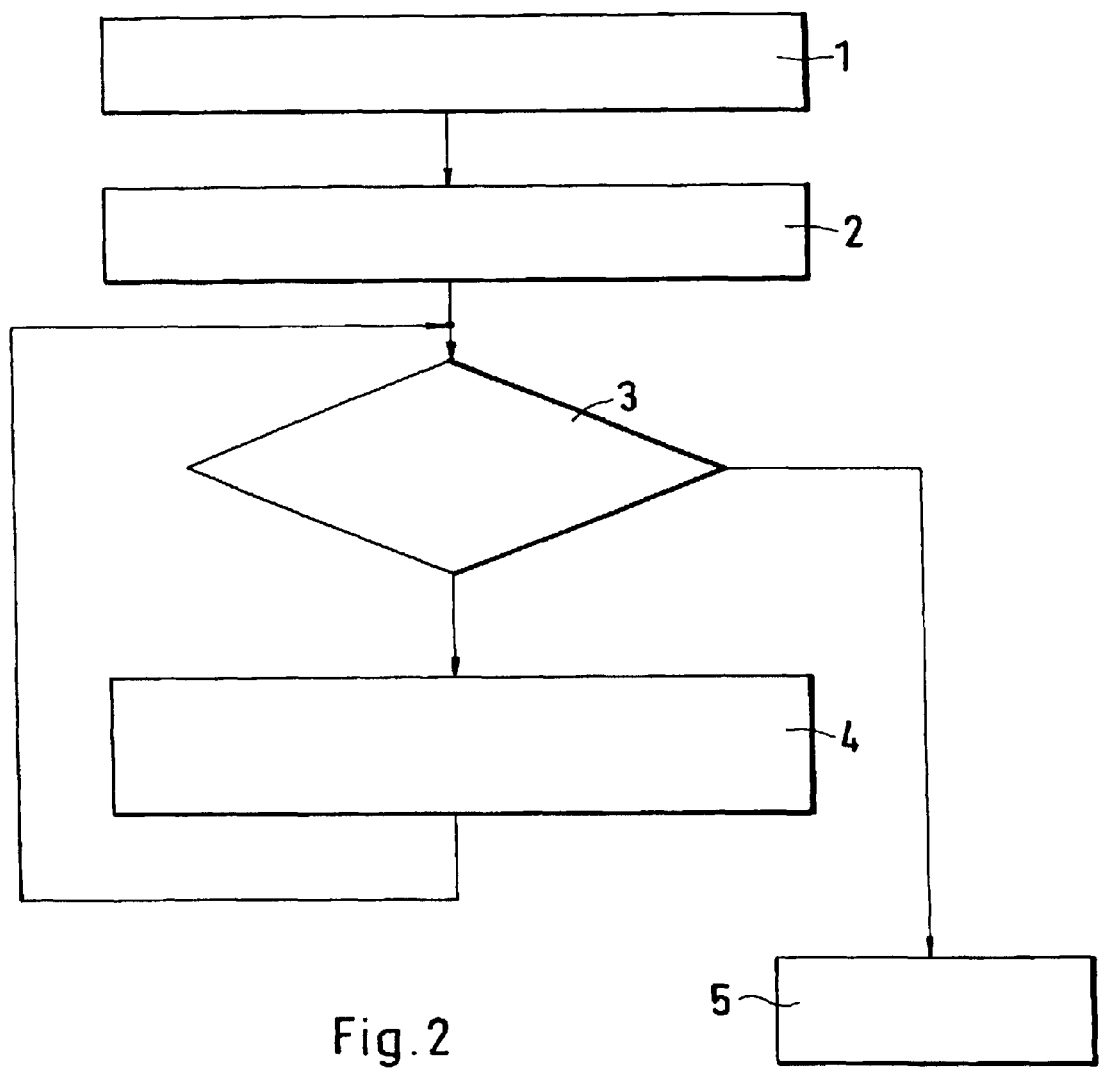
FIG. 2 shows a flowchart for a computer module, program module or software module implementing the process according to the invention.

FIG. 2 shows by way of an example a flowchart of a computer program for the process described above. In step 1, the process P1 is provided with the two identifiers PID1 and RID1. If it is established in step 2 that the process P1 has ended, the system enquires in step 3 whether the functions of this process are completed. If the answer is "yes", the program is terminated (step 5). If otherwise (answer is "No"), a new process P2 with identifier RID1 is started in step 4. This process P2 continues the process P1 in order to execute its still outstanding functions. If this process P2 is also terminated without all functions of the process P1 being completed, the negative reply in step 3 causes a further process to be started, which likewise retains RID1 as the identifier. The program jumps to the end (step 5) only if all functions of the process P1 have been executed, that is to say if the reply in step 3 is positive.

What is claimed is:

1. A method for identifying one or more processes and their resources, each process having a first identifier unambiguously identifying the process and its resources, wherein each process and its resources are provided with a second identifier unambiguously identifying the process and its resources, and when premature termination of a first process occurs, a second process is started to continue the functions of the terminated first process, the second process retaining the second identifier of the terminated first process as its second identifier.

2. The method according to claim 1, wherein the second identifier is protected against at least one of restarting and reloading, which terminates the first process.

3. The method according to claim 1, wherein each second identifier is released only when the functions of the process having this second identifier have been executed.

4. The method according to claim 1, wherein the second identifiers are managed by the operating system.

5. The method according to claim 1, wherein the second identifier is transmitted jointly with other data in a data word.

6. The method according to claim 1, wherein the second identifiers are stored in one or more tables.

7. The method according to claim 1, wherein one or more of said one or more processes are prematurely terminated when no longer required.

8. The method according to claim 1, wherein the processes are telecommunications processes.

9. A computer readable medium tangibly embodying a computer module, a program module or a software module with means for implementing the method according to claim 1.

10. A switching center having at least one computer module, program module or software module according to claim 9.

11. A computer readable medium having a program recorded thereon, said computer readable medium comprising a computer program code means adapted to perform the method of claim 1.

12. A method for identifying a process and its allocated resources, comprising:

unambiguously identifying the process and its resources with a first identifier, wherein the first identifier is dependent on the life of the process;

unambiguously identifying the process and its resources with a second identifier, wherein the second identifier is independent of the life of the process; and when a premature termination of the process occurs, starting a second process to continue the functions of the terminated process, wherein the second process retains the second identifier of the terminated process for accessing resources or data of the terminated process.

* * * * *